United States Patent
Petrillo et al.

(10) Patent No.: US 6,595,661 B2
(45) Date of Patent: Jul. 22, 2003

(54) LAMP HOUSING

(75) Inventors: Bernard Petrillo, Rye, NY (US); Bruno Israel, Kinderhook, NY (US); Theodore Joshua, Pemberton, NJ (US)

(73) Assignee: Carl Zeiss, Oberkochen (DE)

( * ) Notice: Subject to any disclaimer, the term of this patent is extended or adjusted under 35 U.S.C. 154(b) by 0 days.

(21) Appl. No.: 09/681,893

(22) Filed: Jun. 21, 2001

(65) Prior Publication Data

US 2002/0196626 A1 Dec. 26, 2002

(51) Int. Cl.[7] .............................. F21V 14/02
(52) U.S. Cl. .................. 362/286; 362/261; 362/419
(58) Field of Search .................. 362/261, 286, 362/287, 419, 275, 271, 276, 428

(56) References Cited

U.S. PATENT DOCUMENTS

| | | | | |
|---|---|---|---|---|
| 4,935,855 A | * | 6/1990 | Narita | 362/286 |
| 5,609,408 A | * | 3/1997 | Targetti | 362/286 |
| 5,700,084 A | * | 12/1997 | Yasukawa et al. | 362/287 |
| 5,911,502 A | * | 6/1999 | Zillgitt et al. | 362/286 |
| 6,036,337 A | * | 3/2000 | Belfer | 362/287 |

* cited by examiner

*Primary Examiner*—Sandra O'Shea
*Assistant Examiner*—Peggy A. Neils
(74) *Attorney, Agent, or Firm*—Reed Smith LLP

(57) ABSTRACT

An array of photo detectors or a ground glass is employed in concert with a beam-forming reflector to generate a positional error(s) as the light source is displaced from a reference location in the vertical plane. The beam is formed by means of a small hole through the reflector on its optical axis. These error signals are interpreted visually or introduced into electronic servo loops to mechanically drive the lamp assembly to an on-axis reference location. Provision is made to move the reflector along the optical axis to achieve co alignment of the reflected image of the arc source with its direct image.

6 Claims, 2 Drawing Sheets

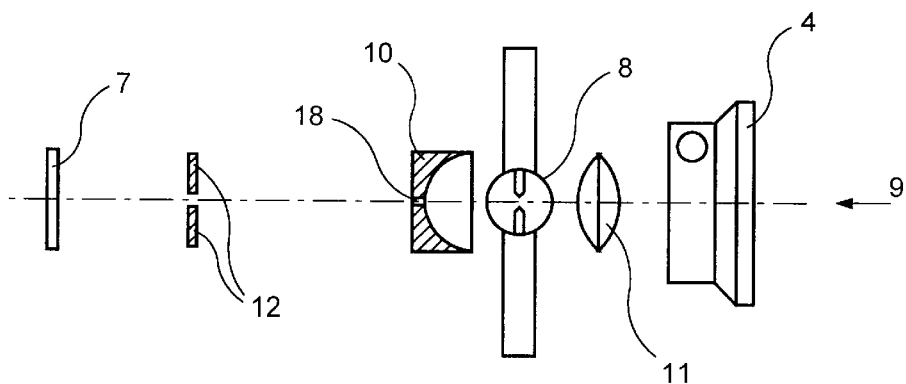
F I G. 2
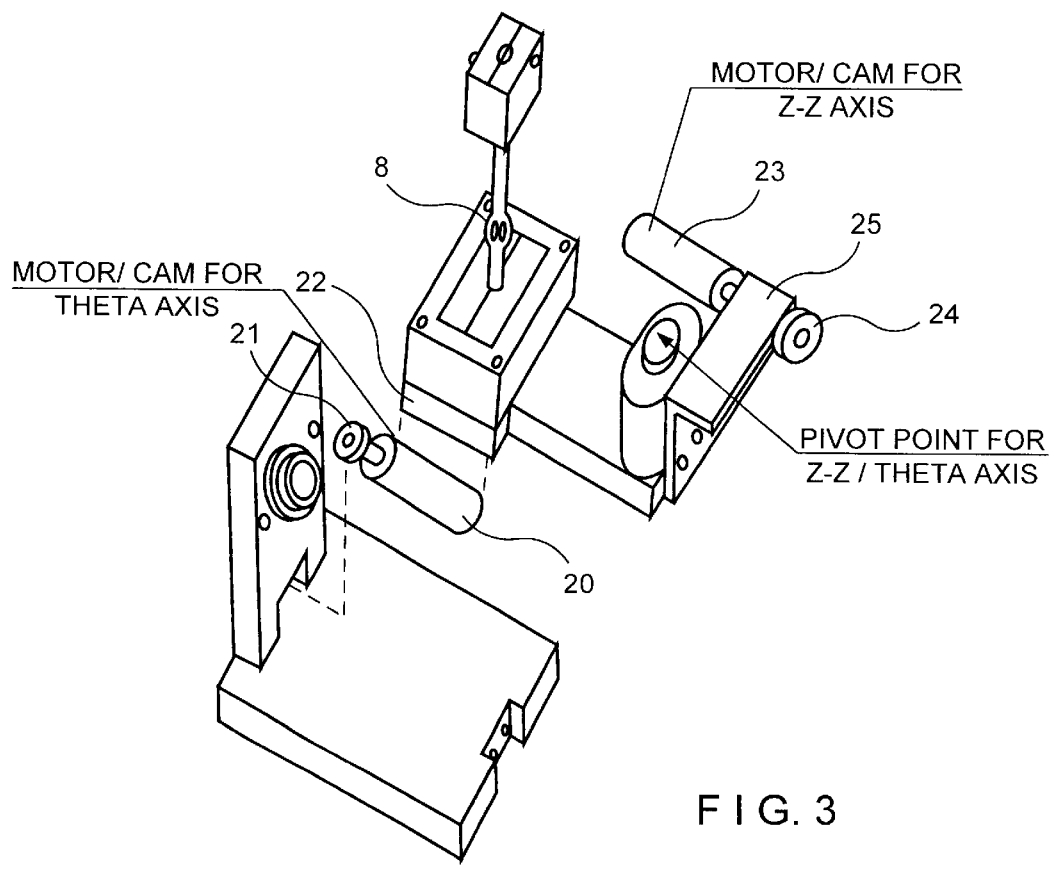
F I G. 3

LAMP HOUSING

BACKGROUND OF INVENTION

1. Field of the Invention

The invention relates to the need to accurately and easily position light sources in general and arc-lamps specifically.

2. Description of the Prior Art

For optimum performance, the relative positions of the lamp, its reflector, and the optical axis require a critical mutual alignment. An array of mechanical approaches have been employed to satisfy this task, but, they are cumbersome and interrelated resulting in an awkward trial-and-error procedure. This inconvenience is amplified because the relative short lifetime of some lamps requires a frequent replacement and, in the case of arc lamps, the short-term variation of arc position relative to its mounting sockets necessitates a continuing realignment.

OBJECTS AND SUMMARY OF THE INVENTION

It is an object of this invention to provide a lamp housing.

It is another object of this invention to provide a lamp housing that minimizes the alignment procedures associated with initial (and replacement) lamp installation.

It is a further object of this invention to achieve a critical portion of this alignment in an accurate manner either manually or automatically.

These goals are attained by mounting the movable light source on an assembly that can develop error signals that detect off axis conditions modifying the lamp reflector to generate a beam of light that develops the necessary position error signals to either manually or automatically position a movable lamp assembly to its proper location in this location in the vertical plane. The beam is formed by machining a small hole in the reflector on its optical axis. The small portion of light that passes through this aperture forms a tightly-defined beam that angularly moves proportionally to the angular movement of the lamp's arc relative to the aperture. A sensing plate is located a short distance behind the reflector, The angular displacement of the light on this plate provides a visual indication of the direction and magnitude of any offset from the desired reference axis. For automatic correction of an offset condition, a photo sensor array in the sensing plate develops the necessary logic signals as inputs to a closed loop servo system. In the automatic mode, cam-driven servos can the movable lamp assembly to drive through a search envelope that results in the beam of light impinging on the photo detectors and, thereby, generating the error information to position the arc on the desired optical axis.

An advantage of the present invention is that the alignment of the arc lamp in the vertical plane is accomplished accurately and, if desired, automatically.

Another advantage of the present invention is that the servo drive mechanism has been designed to eliminate any possibility of encountering mechanical travel limits and inherent logic provides a search pattern to achieve on-axis lockup regardless of initial lamp positions.

These and other objects and advantages of this invention will be evidenced after reading the detailed description of the preferred embodiments as applied to a microscope's arc-lamp housing. Details are illustrated in the following drawings.

BRIEF DESCRIPTION OF THE DRAWINGS

In the drawings:

FIG. 2 is a functional view of the optical axis of the housing; and

FIG. 3 is a view of the lamp mount assembly and exploded cam drive mechanism.

DESCRIPTION OF THE PREFERRED EMBODIMENTS

Figure 1:
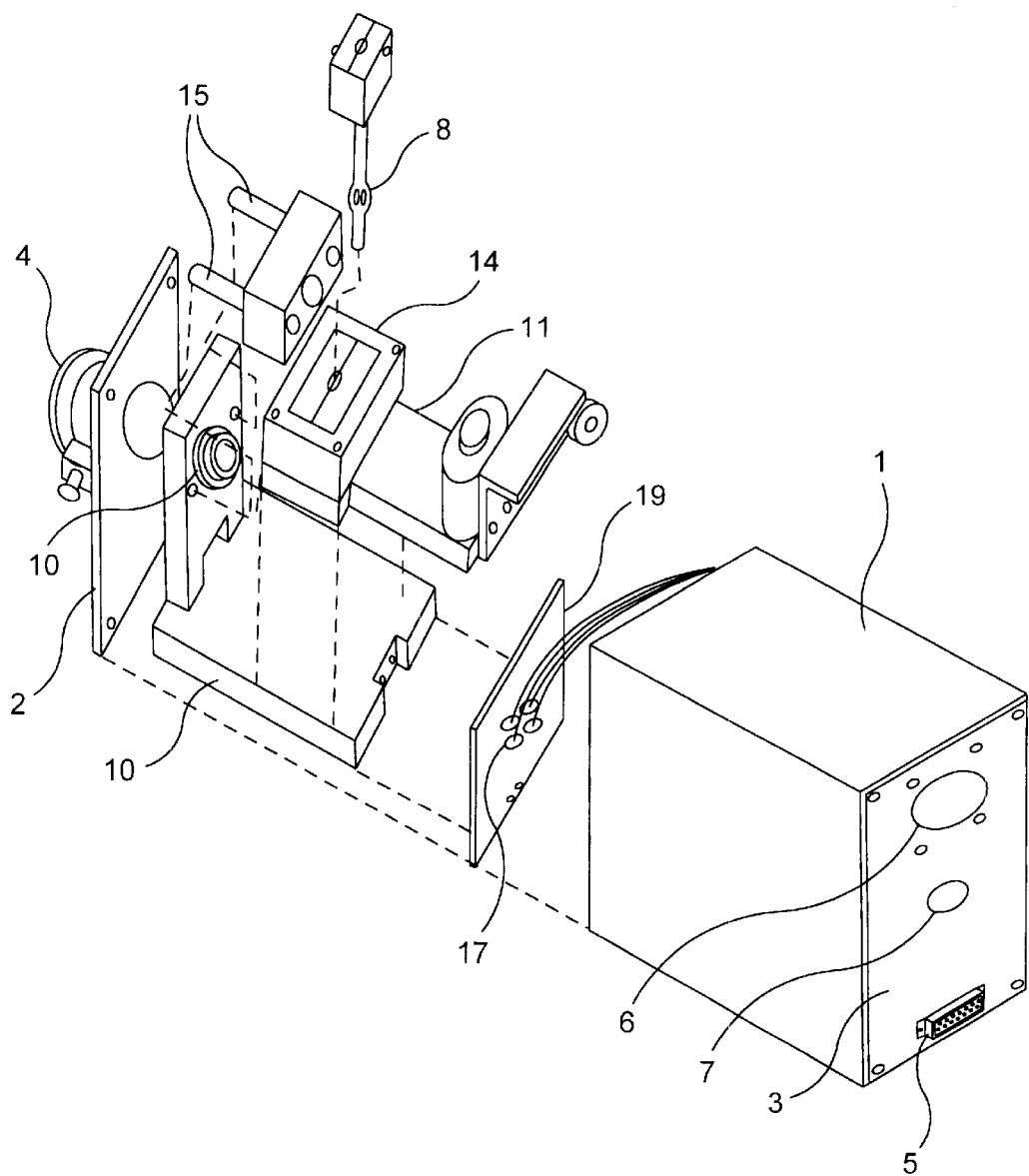
FIG. 1 is a pictorial, exploded view of a lamp housing.

FIG. 1 is an exploded view of the lamp housing. The basic structure consists of an internally-ribbed aluminum extrusion 1 with front 2 and rear 3 end panels.

The front panel is fitted with an adapter 4 to mechanically mate with a microscope's illumination port. This adapter is concentric with the optical axis of this port. The front panel is secured to the extrusion with machine screws at each of its four corners.

The rear panel contains the electrical interface connector 5 and a fan 6 for forced-air cooling. Also contained in the rear panel is a ground glass 7 located on the optical axis. The bottom surface of the extrusion has a perforated section located to allow inlet air to efficiently flow past the arc lamp 8 to the cooling fan. The rear panel is secured to the extrusion with machine screws at each of its four corners.

FIG. 2 is a functional view of the optical axis 9 of the housing. The relative positions of the ground glass 7, reflector 10, collector lens 11, photocell array 12, arc lamp 8, and the illumination port adapter 4 are depicted in this view.

An aluminum platform 13 is rigidly attached to the rear of the front panel. It slides into and out of the extrusion ribbing by means of channel guides on its sides. In this manner, both alignment guidance and vertical support of the platform is achieved, Mounted on the platform is the lamp mount assembly, the reflector 10, and the vertical sensing plate 15.

The lamp mount assembly 14 consists of a moveable Teflon block 14 containing an electrical receptacle for one end of the lamp. This assembly is positioned in the vertical plane, i.e., vertically and horizontally, by two motor-driven cam mechanisms. Closed-loop positioning data for these cam drives is derived from the logic output of the photo sensor array 12.

Two rods 15 extend from the front panel to provide support for the reflector sub housing and to allow the reflector to be properly positioned along the optical axis. A small hole 18, concentric with the optical axis, has been drilled through the reflector to allow a portion of the lamp's energy to penetrate the reflector and produce a conical beam of light that emanates from the rear of the reflector.

The sensing plate 17 is mounted vertically at the rear of the platform. The plate contains the array of four photo sensors 12 used to detect the location of the rearward-propagated light beam from the reflector. The photo sensors are positioned in the sensing plate at increments of 90 degrees about the optical axis in a manner that results in pairs of sensors being located on both the vertical and horizontal axes of the sensing plate. The wired output of the array is conducted to the housing's rear connector. An external two-channel servo amplifier constantly interprets the sensor outputs and derives motor drive signals to position the lamp mount assembly to attain an on-axis condition for the radiation of the lamp. In the manual alignment mode, the photo sensor array is removed to allow the rearward beam to impinge on the ground glass in the rear plate.

FIG. 3 is a view of the lamp mount assembly and its associated cam drive mechanism. The vertical drive system consists of a motor 20, cam 21, and vertical drive plate 22. As the motor rotates, the vertical plate is driven up and down consistent with the offset and diameter dimensions of the vertical cam. The thickness of the cam along its drive axis and the width of the vertical drive plate are designed to accommodate the horizontal excursions of the lamp mount as it is driven by the horizontal cam system.

In similar fashion, the horizontal drive system consists of a motor 23, cam 24, and horizontal drive plate 25. As the horizontal motor rotates, the horizontal plate is driven left and right consistent with the offset and diameter dimensions of the horizontal cam. The thickness of the cam along its drive axis and the width of the horizontal drive plate are designed to accommodate the vertical excursions of the lamp mount as it is driven by the vertical cam system.

While the foregoing description and drawings represent the present invention, it will be obvious to those skilled in the art that various changes may be made therein without departing from the true spirit and scope of the present invention.

What is claimed is:

1. A lamp housing, comprising:
   a movable lamp assembly that can be positioned in a vertical plane to achieve alignment with a desired optical axis that is perpendicular to this vertical plane;
   a non-moving, light-blocking plate being positioned behind the lamp having a small centered hole;
   means being provided to detect the desired on-axis condition by detecting the deviation of a rearward projected beam from said small centered hole in said plate;
   whereby as the lamp is displaced in the vertical and horizontal axes tat define its vertical plane, a corresponding angular beam displacement occurs in the rearward projected beam.

2. The lamp housing of claim 1, further comprising:
   an arc lamp;
   a photo detector array;
   said rearward emanating light beam from said light-blocking plate located behind the arc lamp with a small centered hole impinging on said photo detector array so that the arc lamp is displaced along the vertical and horizontal axes that define its vertical plane, a corresponding angular beam displacement occurs and different elements of the photo detector array are illuminated to form a light-stimulated pattern; said light-stimulated pattern being a direct indication of the displacement characteristics of the arc lamp in its vertical plane.

3. The lamp housing of claim 2, further comprising:
   two separate positioning drives capable of displacing the movable lamp assembly in two orthogonal-related axes in said lamp's vertical plane; both of said axes are perpendicular to the overall optical axis of the system; error signals for the drives being developed from said photo detector array; elements of the array being arranged in a cruciform pattern and coaligned with each of their respective drives.

4. The lamp housing of claim 3, further comprising:
   an enhancement to the light-blocking plate wherein said plate is shaped as a reflector with a small centered hole through the reflector on its optical axis; mechanical adjustment being provided to allow said reflector to be manually positioned along the system's optical axis to attain a superposition of its reflected image with a direct image of the arc.

5. The lamp housing of claim 4, further comprising:
   eccentric cams being incorporated on the rotary outputs of drive motor shafts of said drives; said cams having a periphery which interface with a flat surface on the driven lamp assembly so as to result in a mechanical arrangement wherein the displacement of the lamp assembly is constrained to a distance that cannot exceed maximum offset diameters of the respective cams and, as the motor(s) continue to drive past this maximum point in search of a desired on-axis location, an automatic reversal of the drive direction occurs with a corresponding inversion of position-sensing logic; whereby no mechanical limiting or sensing devices are required to prevent the drive assembly from experiencing excessive mechanical excursions and no additional logic is necessitated to reverse the drive direction of the motors at a protective mechanical travel limit.

6. The lamp housing of claim 1, further comprising:
   an arc lamp;
   a photo detector array;
   said rearward emanating light beam from said light-blocking plate located behind the arc lamp with a small hole impinging on said photo detector array so that the arc lamp is displaced along the vertical and horizontal axes that define its vertical plane, a corresponding angular beam displacement occurs and different elements of the photo detector array are illuminated to form a light-stimulated pattern; said light-stimulated pattern being a direct indication of the displacement characteristics of the arc lamp in its vertical plane.

* * * * *